(12) United States Patent
Lopez Gonzalez

(10) Patent No.: US 9,994,166 B2
(45) Date of Patent: Jun. 12, 2018

(54) DUAL MOLDED GRAB HANDLE SPACER FOR A MOTOR VEHICLE

(71) Applicant: FORD GLOBAL TECHNOLOGIES, LLC, Dearborn, MI (US)

(72) Inventor: Luis Miguel Lopez Gonzalez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 14/829,946

(22) Filed: Aug. 19, 2015

(65) Prior Publication Data
US 2017/0050585 A1  Feb. 23, 2017

(51) Int. Cl.
A47J 45/07 (2006.01)
B60R 13/02 (2006.01)
B60N 3/02 (2006.01)

(52) U.S. Cl.
CPC .......... *B60R 13/0212* (2013.01); *B60N 3/026* (2013.01)

(58) Field of Classification Search
CPC ....................................................... B60R 7/10
See application file for complete search history.

(56) References Cited

U.S. PATENT DOCUMENTS 3,657,765 A * 4/1972 Geisinger ................ A45F 5/10
  16/406
3,912,300 A * 10/1975 Bryan, Jr. ............ B62D 53/021
  180/420
4,364,150 A * 12/1982 Remington ............ A45C 13/26
  16/409
6,398,272 B1 * 6/2002 Plummer ................ E05C 19/06
  292/246
6,523,888 B1   2/2003 Yan et al.
7,080,914 B1 * 7/2006 Boddy .................... B60R 1/072
  359/879
7,566,292 B1 * 7/2009 Hauser .................... A63B 1/00
  16/422
7,886,404 B2 * 2/2011 Chen ...................... A45B 9/02
  16/113.1
7,955,117 B2 * 6/2011 Nolting ................... H01R 4/30
  439/411
8,621,720 B2 * 1/2014 Kao ................. B29C 45/14065
  16/114.1
9,266,477 B2 * 2/2016 Huelke .................... B60R 7/10
2006/0006568 A1  1/2006 Cowelchuk et al.
2006/0143868 A1  7/2006 Bauer
2007/0267884 A1  11/2007 Failla et al.

(Continued)

FOREIGN PATENT DOCUMENTS

CN    101168293 A    4/2008
DE    19638007 A1    5/1997

OTHER PUBLICATIONS

English machine translation for DE19638007A1.
English machine translation for CN101168293A.

*Primary Examiner* — Amy J. Sterling
(74) *Attorney, Agent, or Firm* — Vichit Chea; King & Schickli, PLLC

(57) ABSTRACT

A grab handle spacer includes a first fastener receiver, a second fastener receiver and a first integral articulating joint. The grab handle spacer is dual molded from thermoplastic and thermoplastic elastomer materials which allow flexing, twisting and bending during the assembly process.

14 Claims, 4 Drawing Sheets

(56) References Cited

U.S. PATENT DOCUMENTS

| | | | |
|---|---|---|---|
| 2009/0314920 A1* | 12/2009 | Vukadin | F16B 21/088 248/562 |
| 2011/0108632 A1* | 5/2011 | Brandenburg | A61L 9/12 239/34 |
| 2011/0291435 A1 | 12/2011 | Matusko et al. | |
| 2014/0120364 A1 | 5/2014 | Peca et al. | |
| 2016/0131194 A1* | 5/2016 | Johnson | B25B 27/14 29/898.06 |

* cited by examiner

DUAL MOLDED GRAB HANDLE SPACER FOR A MOTOR VEHICLE

TECHNICAL FIELD

This document relates generally to the motor vehicle equipment field and, more particularly, to a dual molded grab handle spacer that allows articulation in multiple directions to accommodate for different sheet metal tolerance geometries and reduce headliner clip insertion efforts at any assembly plant.

BACKGROUND

A grab handle spacer is a plastic component that helps to commonize sheet-metal attachment points for headliners and allow different headliner surface designs. In many applications, a grab handle spacer holds multiple resilient clips used to mount the headliner to the sheet metal roof component of the motor vehicle. FIG. 1 illustrates a prior art grab handle spacer S which includes a ribbed structure R to provide strength to the part. The overall wall thickness is constant across the plastic component. As a result, the prior art grab handle spacer S is quite rigid.

Sometimes during headliner installation, the resilient clips carried on the grab handle spacers are not or cannot be inserted simultaneously into the mounting holes in the sheet metal. As a result, the last clip to be inserted has to overcome some stress coming from the grab handle spacer. Due to sheet-metal variation, it should be appreciated that the clip attachment surfaces are not always directly aligned. The rigidity of the prior art grab handle spacer S is not very effective at accommodating sheet-metal variation/tolerance variation, thereby creating a higher insertion effort to complete the installation of the headliner clips.

This document relates to a new and improved grab handle spacer that is dual molded from thermoplastic material and thermoplastic elastomer so as to provide the necessary articulation to accommodate a variance in sheet-metal tolerance condition, reduce the stress on the grab handle spacer component and reduce clip insertion efforts at any assembly plant.

SUMMARY

In accordance with the purposes and benefits described herein, a grab handle spacer is provided for a motor vehicle. That grab handle spacer comprises a one-piece body having a first portion molded from thermoplastic material and a second portion molded from thermoplastic elastomer. In one possible embodiment, the first portion includes a first end of the one-piece body and a second end of the one-piece body. The first end includes a first receiver and the second end includes a second receiver. In addition, the second portion includes a central section of the one-piece body.

The central section includes two segments separated by a central opening so as to allow bending and twisting of the grab handle spacer to compensate for variations in the positions of sheet-metal attachment points. Further, the one-piece body includes a first transition section between the first end and the central portion and a second transition section between the second end and the central portion. The first transition section has a first part made from thermoplastic material and a second part made from a thermoplastic elastomer. The second transition section is made from thermoplastic material.

In accordance with an additional aspect, the grab handle spacer may further include a first fastener received in the first receiver and a second fastener received in the second receiver. The first fastener may be a first resilient headliner clip and the second fastener may be a second resilient headliner clip.

Thermoplastic materials useful for the molding of the grab handle spacer may be selected from a group consisting of acetal (POM), acrylonitrile butadiene styrene (ABS) polycarbonate acrylonitrile butadiene styrene (PC ABS) and mixtures thereof. Thermoplastic elastomer materials useful in the molding of the grab handle spacer may be selected from a group consisting mainly of styrenic block copolymers (TPEs), thermoplastic polyurethanes (TPU) and mixtures thereof.

Alternatively, the grab handle spacer for the motor vehicle may be described as comprising a body including a first fastener receiver, a second fastener receiver and a central section between the first fastener receiver and the second fastener receiver. The first fastener receiver and the second fastener receiver are made from a thermoplastic material and the central section is made from a thermoplastic elastomer. In one possible embodiment, the central section includes two segments separated by a central opening. In one possible embodiment the body is one piece: that is, dual molded as a single universal body.

Alternatively, the grab handle spacer for a motor vehicle may be broadly described as comprising a body including a first fastener receiver, a second fastener receiver and a first integral articulating joint between the first fastener receiver and the second fastener receiver. In one possible embodiment, the grab handle spacer further includes a second integral articulating joint between the first fastener receiver and the first integral articulating joint. The first integral articulating joint may include a central opening. Further, the first articulating joint and the second articulating joint may be made from a thermoplastic elastomer while the first fastener receiver and the second fastener receiver are made from a thermoplastic material suited to receive and hold a resilient clip such as a headliner clip.

In the following description, there are shown and described several preferred embodiments of the grab handle spacer. As it should be realized, the grab handle spacer is capable of other, different embodiments and its several details are capable of modification in various, obvious aspects all without departing from the grab handle spacer as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the grab handle spacer and together with the description serve to explain certain principles thereof. In the drawing figures.

Reference will now be made in detail to the present preferred embodiments of the grab handle spacer, examples of which are illustrated in the accompanying drawing figures.

DETAILED DESCRIPTION

Figure 1:
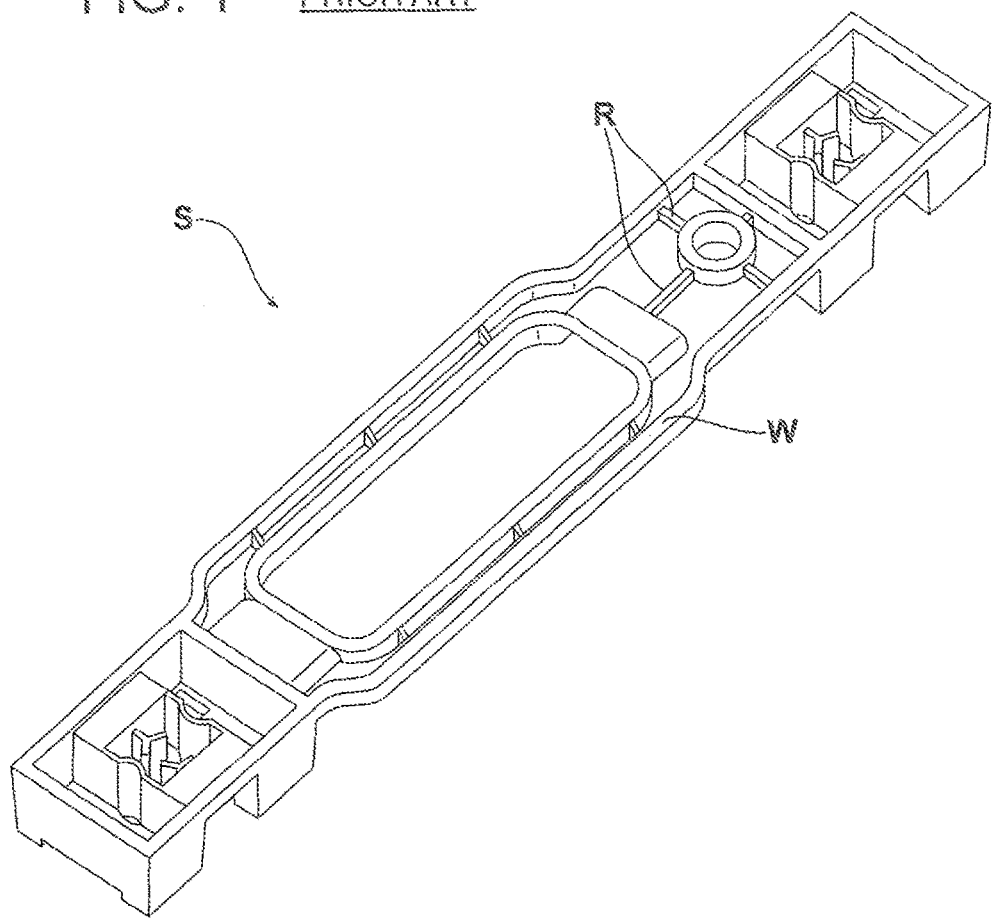
FIG. 1 is a perspective view of a prior art grab handle spacer molded completely from thermoplastic material.
Figure 2:
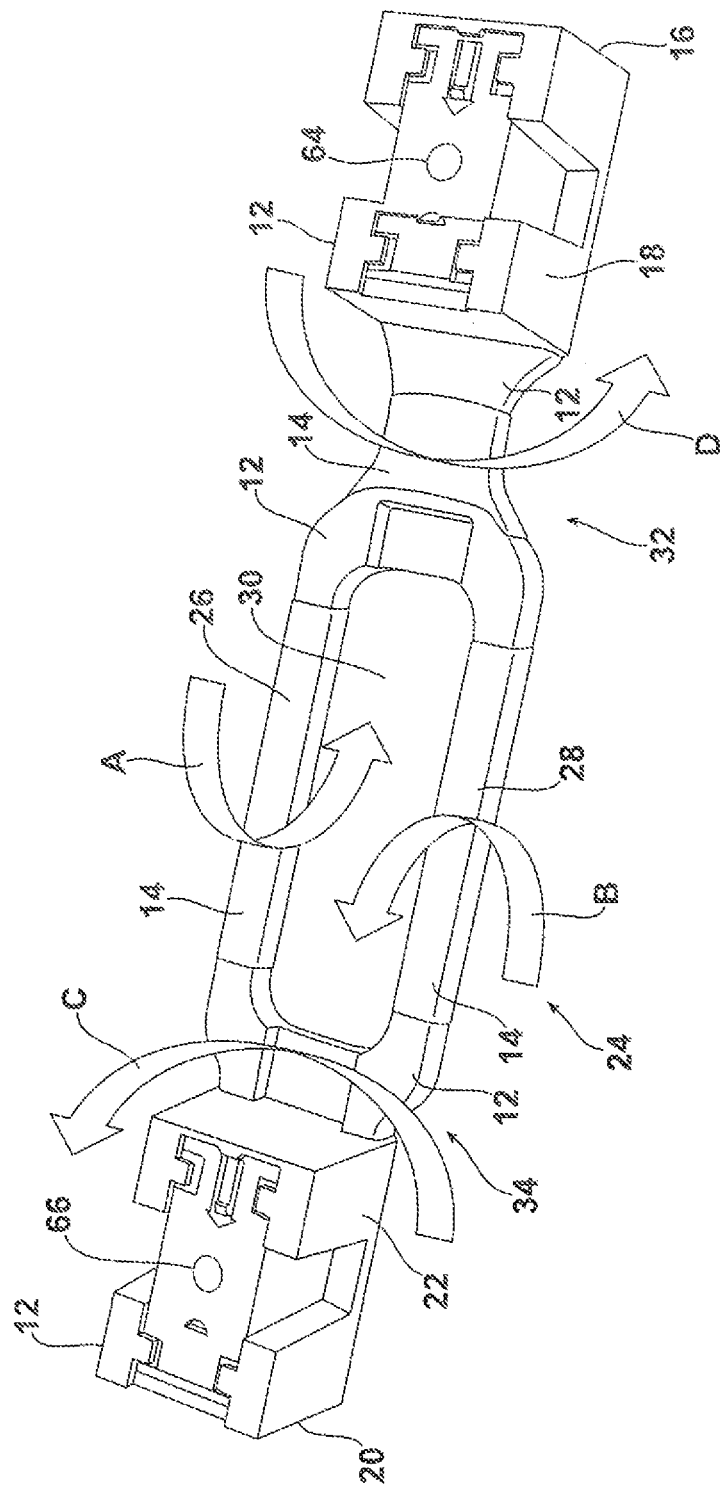
FIG. 2 is a detailed perspective view of the new dual molded grab handle spacer incorporating a one-piece body having a first portion molded from thermoplastic material and a second portion molded from thermoplastic elastomer.

Reference is now made to FIG. 2 illustrating in detail the grab handle spacer 10 that is the subject matter of this document. The grab handle spacer 10 is dual molded so as to have a one-piece body wherein a first portion 12 is molded from a thermoplastic material and a second portion 14 is molded from a thermoplastic elastomer. Thermoplastic materials useful in the molding of the first portion 12 of the one-piece body of the grab handle spacer 10 to fasten rigid structures and provide stiffness include, but are not necessarily limited to, acetal (POM), acrylonitrile butadiene styrene (ABS), polycarbonate acrylonitrile butadiene styrene (PC ABS) and mixtures thereof. Thermoplastic elastomer materials useful in the molding of the second portion 14 of the one-piece body of the grab handle spacer 10 to provide articulated joints and flexible structures include, but are not necessarily limited to, styrenic block copolymers (TPEs), thermoplastic polyurethanes (TPU) and mixtures thereof.

More specifically, the first portion 12 includes a first end 16 having a first fastener receiver 18 and a second end 20 having a second fastener receiver 22. The second portion 14 includes a central section 24 that is provided between the first end 16/first fastener receiver 18 and the second end 20/second fastener receiver 22. As illustrated, the central section 24 includes two segments 26, 28 separated by a central opening 30 so as to allow bending and twisting of the grab handle spacer 10 to compensate for variations in the location of sheet-metal attachment points (note action arrows A, B and C). Thus, it should be appreciated that the central section 24 effectively forms a first integral articulating joint.

As further illustrated in FIG. 2, the one-piece body includes a first transition section 32 between the first end 16/first fastener receiver 18 and the central section 24 and a second transition section 34 between the second end 20/second fastener receiver 22 and the central section.

The first transition section includes a first part 36 made from a thermoplastic material and a second part 38 made from a thermoplastic elastomer. Thus, the first transition section functions as a second articulating joint between the first fastener receiver 22 and the first integral articulating joint formed by the second section 24 allowing bending and twisting as illustrated by action arrow D.

The second transition section 34 of the illustrated embodiment is made exclusively from thermoplastic material.

Figure 3:
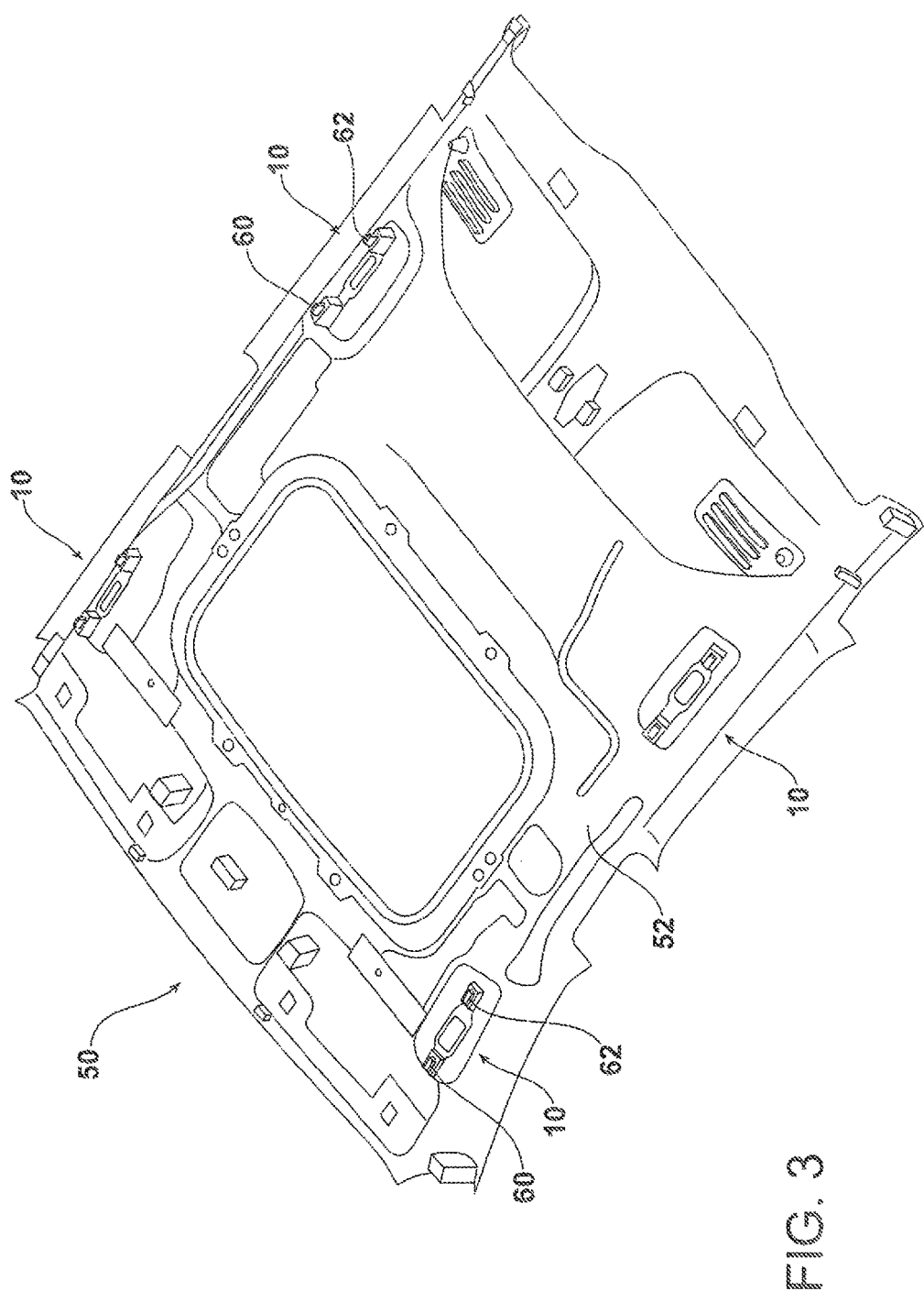
FIG. 3 is a schematic perspective view illustrating a headliner assembly with four grab handle spacers for mounting a headliner and grab handles to a sheet-metal roof component of a motor vehicle.

Reference is now made to FIG. 3 illustrating how a headliner assembly 50, including a head liner 52, four grab handles 54 (hidden from view in FIG. 3 but shown in FIG. 4) and four grab handle spacers 10, is mounted to four mounting brackets 56 carried on the sheet metal roof component 58.

The head liner assembly 50 is preassembled from the head liner 52, the four grab handles 54 and the four grab handle spacers 10. First, a first resilient fastener clip 60 is secured in each first receiver 18 of each grab handle spacer 10 and a second resilient fastener clip 62 is secured in each second receiver 22 of each grab handle spacer. The clips 60, 62 are then aligned with cooperating mounting apertures formed in the head liner 52. Screws or other appropriate fasteners (not shown) are then used to secure the grab handles 54 to the grab handle spacers 10. More specifically, the screws engage in the holes 64, 66 formed in the ends of the receivers 18, 22 that hold the resilient clips 60, 62 while the head liner 52 is captured between the grab handles 54 and the grab handle spacers 10.

Figure 4:
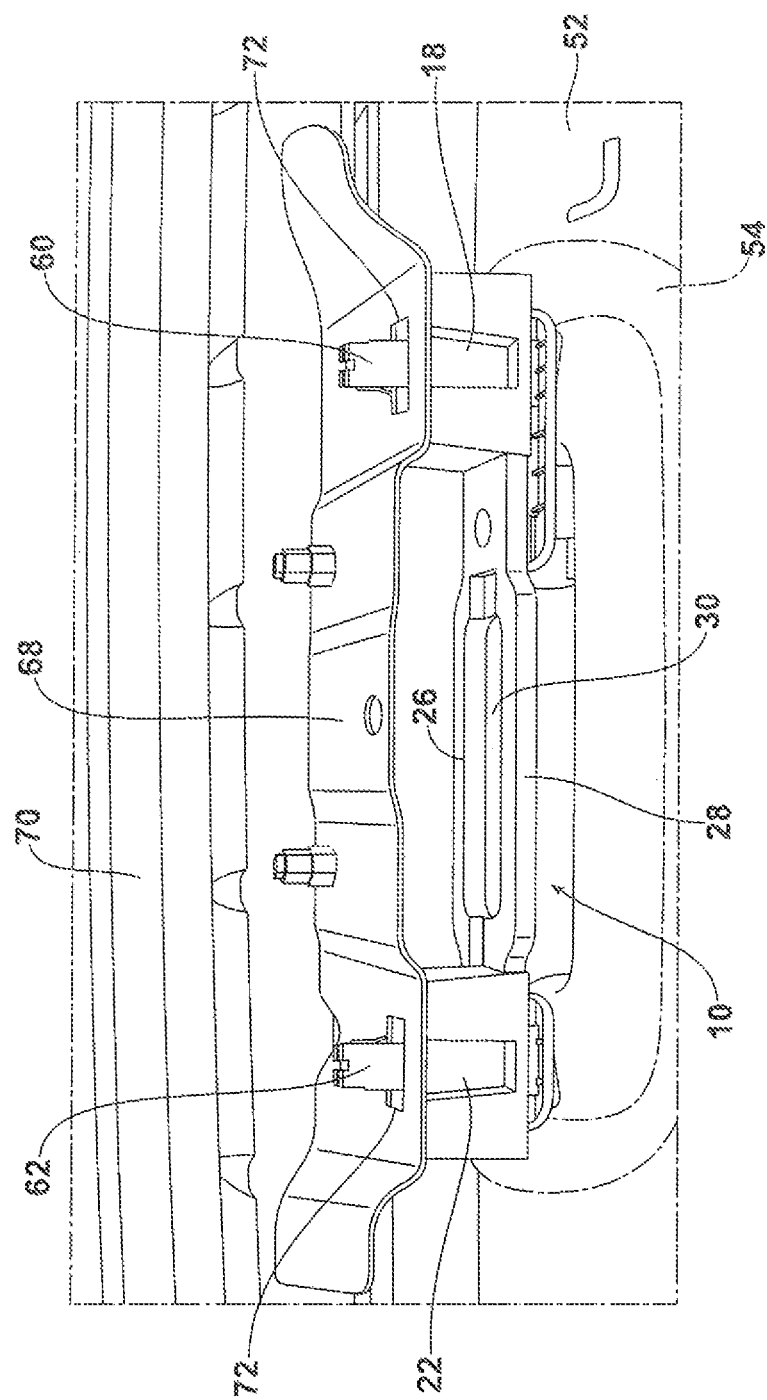
FIG. 4 is a detailed perspective view illustrating one grab handle spacer in position between the sheet-metal roof component and the headliner of a motor vehicle.

Reference is now made to FIG. 4, illustrating in detail the attachment of one grab handle spacer 10 to a sheet metal mounting bracket 68 carried on the sheet metal roof component 70. More specifically, the resilient clips 60, 62 are forced/snapped into cooperating apertures 72 in the mounting bracket 68 in order to complete the connection. As should be appreciated, the articulating joints provided by the second portions 14 of the grab handle spacer 10 made from thermoplastic elastomer material allow flexing, twisting and bending to accommodate manufacturing variances/tolerances so as to simplify the assembly process.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A grab handle spacer for a motor vehicle, comprising:
a body having a first portion molded from a thermoplastic material and a second portion molded from a thermoplastic elastomer, wherein said first portion includes a first end of said body and a second end of said body, wherein said second portion includes a central section of said body, and wherein said central section includes two segments separated by an enclosed central opening so as to allow bending and twisting of said grab handle spacer to compensate for variations in sheet metal attachment points.

2. The grab handle spacer of claim 1, wherein said first end includes a first receiver and said second end includes a second receiver.

3. The grab handle spacer of claim 2, wherein said body includes a first transition section between said first end and said central section and a second transition section between said second end and said central section.

4. The grab handle spacer of claim 3, wherein said first transition section includes a first part made from thermoplastic material and a second part made from thermoplastic elastomer.

5. The grab handle spacer of claim 4, wherein said second transition section is made from thermoplastic material.

6. The grab handle spacer of claim 5, further including a first fastener received in said first receiver and a second fastener received in said second receiver.

7. The grab handle spacer of claim 6, wherein said first fastener is a first resilient clip and said second fastener is a second resilient clip.

8. The grab handle spacer of claim 1, wherein said thermoplastic material is selected from a group of materials consisting of acetal (POM), acrylonitrile butadiene styrene (ABS), polycarbonate acrylonitrile butadiene styrene (PC ABS) and mixtures thereof.

9. The grab handle spacer of claim 8, wherein said thermoplastic elastomer is selected from a group of materials consisting of styrenic block copolymers (TPEs), thermoplastic polyurethanes (TPU) and mixtures thereof.

10. The grab handle spacer of claim 1, further including a headliner assembly.

11. A grab handle spacer for a motor vehicle, comprising:
a body including a first fastener receiver, a second fastener receiver and a central section between said first fastener receiver and said second fastener receiver wherein said first fastener receiver and said second fastener receiver are made from a thermoplastic material and said central section is made from a thermoplastic elastomer, wherein said central section includes two segments completely separated by a central opening so as to allow bending and twisting of said grab handle spacer to compensate for variations in sheet metal attachment points.

12. A grab handle spacer for a motor vehicle, comprising:
a body including a first fastener receiver, a second fastener receiver and a first integral articulating joint between said first fastener receiver and said second fastener receiver, wherein said first integral articulating joint includes a central opening.

13. The grab handle spacer of claim 12 further including a second integral articulating joint between said first fastener receiver and said first integral articulating joint.

14. The grab handle spacer of claim 13, wherein said first integral articulating joint and said second integral articulating joint are made from a thermoplastic elastomer while said first fastener receiver and second fastener receiver are made from a thermoplastic material.

\* \* \* \* \*